United States Patent [19]
Ichihara et al.

[11] Patent Number: 6,116,755
[45] Date of Patent: Sep. 12, 2000

[54] WATERPROOF COVER FOR LIGHTING FIXTURE FOR VEHICLE

[75] Inventors: Motoyuki Ichihara; Satoshi Nagasawa, both of Tokyo, Japan

[73] Assignee: Stanley Electric Company, Tokyo, Japan

[21] Appl. No.: 09/145,502

[22] Filed: Sep. 2, 1998

[30] Foreign Application Priority Data

Apr. 9, 1998 [JP] Japan ..................................... 9-254125

[51] Int. Cl.⁷ .................................................... F21V 29/00
[52] U.S. Cl. ........................... 362/267; 362/507; 362/519
[58] Field of Search ..................................... 362/267, 507, 362/509, 512, 514, 519, 559

[56] References Cited

U.S. PATENT DOCUMENTS 5,607,218  3/1997  Choki ......................................... 362/61

*Primary Examiner*—Sandra O'Shea
*Assistant Examiner*—John Anthony Ward

[57] ABSTRACT

A lighting fixture for a vehicle where a fit part of a waterproof cover and the mounting part of a reflector are covered with a removal preventing piece in the waterproof construction of the reflector so mounted as to be tilt freely in the lamp housing. The removal preventing piece is provided around the peripheral part of a socket cover for a lamp socket of the used lamp and the number of parts is all the smaller or the use of the flange part on the lamp socket as a removal preventing piece makes it possible to provide a simpler and smaller lighting fixture for a vehicle.

6 Claims, 2 Drawing Sheets

Prior Art

WATERPROOF COVER FOR LIGHTING FIXTURE FOR VEHICLE

BACKGROUND OF THE INVENTION

1. Field of the Invention

The present invention relates to a lighting fixture for a vehicle, and more particularly, to a lighting fixture for a vehicle that has an improved waterproof cover in the inner aiming type headlight.

2. Background Art

In a conventional headlight for a vehicle in which a lamp-holding reflector is so fixed as to tilt freely in a headlight housing fixed to a car body, the housing has an opening for lamp replacement in the rear thereof. Such an opening needs waterproof means to keep rainwater, dust, and grit out of the opening. FIGS. 3 and 4 show conventional examples of a lighting fixture for a vehicle having such a waterproof construction.

FIG. 3 will be first described hereinafter. A lamp housing 30 is fixed to a car body (not shown). Opening 31 is formed in the center of the rear of the housing 30. Annular mounting part 32 protruding rearward is formed around the edge of the opening 31. Mating edge 33 protruding in the radial direction is formed around the rear-end edge of the said annular mounting part 32.

A reflector 34 is supported in the lamp housing 30 so that it can tilt freely. A lamp 35 is supported in the center of the rear of the reflector 34 so that the lamp can be inserted into or removed from the reflector.

A waterproof cover 36 comprises a cylindrical fit part 37 to be fit on the outer diameter part of the lamp 35 and a cylindrical part 38 to have the lamp housing 30 fitted into it. The cylindrical fit part 37 is connected to the cylindrical part 38 through bellows-like intermediate part 39. The inside circumferential surface of the cylindrical part 38 has mating groove 40 which mates with the mating edge 33 of the lamp housing 30.

According to the above configuration of a conventional lighting fixture for a vehicle, the space between the lamp 35 moving with a tilting reflector 34 and the opening 31 in the lamp housing 30 is waterproofed by the waterproof cover 36.

However, the waterproof cover 36 is fit directly into the lamp 35 and the waterproof cover 36 must be removed from the lamp housing 30 when the lamp 35 is replaced. For this reason, the above-mentioned lighting fixture for a vehicle has problems such as possibly the waterproof cover is reattached incompletely to the lamp or the waterproof cover is damaged, thus resulting in a drop in its waterproof performance.

FIG. 4 shows another conventional example of a headlight for a vehicle so constructed as to use a waterproof cover not fit directly into a lamp to solve the above problems and make it possible to replace the lamp without removing the waterproof cover from the lamp housing.

A lamp housing 43 is mounted and fixed to a car body (not shown). The lamp housing 43 has an opening 44 in the center of the rear thereof.

A cylindrical mounting part 45 of the said opening 44 protrudes rearward. The said mounting part 45 comprises a smaller-diameter cylindrical front-half part 45*b* and a larger-diameter cylindrical rear-half part 45*a*. A mating piece 47 protrudes like a flange between these cylindrical parts in the radial direction. A bumping edge 46 which protrudes toward the center of the housing in a radial direction is formed at the end edge of the mounting part 45.

A reflector 42 has an opening 48 in the center of the rear thereof. A cylindrical mounting part 49 is formed rearward around the edge of the opening 48. A lamp is inserted into the mounting part 49 such that a lamp socket is in close contact with an inside circumferential surface 49*a* the mounting part.

A cylindrical wall part 50 is formed around the mounting part 49 and the cylindrical wall part 50 has a larger diameter than that of the mounting part 49 and surrounds the mounting part 49. An external cylindrical wall part 51 is formed around the cylindrical wall part 50 and the external wall part 51 has a larger diameter than that of the cylindrical wall part 50 and surrounds the said cylindrical wall part 50.

A block-like connecting part 63 connects the cylindrical wall part 50 to the external cylindrical wall part 51. The rear end of the connecting part 63 is provided with a screw hole 64.

A retainer ring 52 is provided to fix the lamp 41. The retainer ring 52 is fixed to the block-like connecting part 63 with a screw 65 to fix the lamp firmly.

A waterproof cover 53 has a cylindrical fit part 54 in a central portion of the cover, a cylindrical mounting part 56 located on the peripheral portion thereof, and a thin intermediate part 55 connecting the cylindrical fit part 54 to the cylindrical mounting part 56.

The said fit part 54 is pressure-fit into close contact with the external cylindrical wall part 51 of the reflector 42. A retainer ring 57 comprises an annular retaining part 58, a side wall part 59, and a mating part 60. The said mating part 60 has a mating piece 61.

The mating part 60 mates with the mating piece 47 of the lamp housing 43 when the waterproof cover 53 is turned while pushed. At the same time, the mounting part 56 of the waterproof cover 53 then comes into contact with the rear-half part 45*b* of the lamp housing 43 and is pushed by the retainer ring 57 to seal the space between the mounting part 56 and the rear-half part 45*b*.

As described above, the above-mentioned waterproof cover is not fit directly into the lamp. That makes it unnecessary to remove the waterproof cover from the lamp housing every time the lamp is replaced, thus reducing the possibility of damage to the waterproof cover once it is attached to the lamp housing completely. In addition, the waterproof cover will never be reattached to the lamp housing incompletely once it is attached completely, resulting in no possibility of a drop in the waterproof performance of the cover.

However, in the headlight for a vehicle shown in FIG. 3 and the improved headlight for a vehicle shown in FIG. 4, the central cylindrical fit part of the waterproof cover is pressure-fit into close contact with the external cylindrical wall part provided for the lamp or reflector and the fit part is exposed. Consequently it has been thought that an unexpected touch with or push on the exposed fit part by a user would lead to a drop in the waterproof performance of the cover. In addition, the waterproof cover in the conventional example shown in FIG. 4 requires a retainer ring. The resulting larger number of parts has made the construction of the waterproof cover complicated and the waterproof cover troublesome to build.

SUMMARY OF THE INVENTION

It is an object of the present invention to prevent a drop in the waterproof performance of the cover, particularly, due to an unexpected push on the fit part of the waterproof cover in the waterproof construction of the reflector so mounted as to be tilt freely in the lamp housing and to solve the problems with the waterproof cover by covering the fit part with a piece for preventing an unexpected removal of the fit part.

Furthermore, the reduction in the number of parts is attained through the use of the piece formed by the flange part provided in a lamp socket and a socket cover provided for the lamp socket.

The first aspect of the present invention is to provide a lighting fixture for a vehicle, comprising a housing having an opening, a reflector holding a lamp in an opening that is so supported as to be tilt freely in the housing, and a waterproof cover that covers a space between the reflector opening and the housing opening, wherein a cylindrical mounting part is formed to protrude rearward in the rear of the reflector, a cylindrical mounting part is formed to protrude rearward in the rear of the housing, and the waterproof cover comprises a cylindrical fit part positioned inside, a cylindrical mounting part positioned outside, and an intermediate part connecting these parts, and wherein the said fit part of the waterproof cover is mounted on the mounting part of the reflector, the said mounting part of the waterproof cover is mounted on the mounting part of the housing, and the said fit part of the waterproof cover and the mounting part of the reflector are covered with the piece for preventing an unexpected removal of the fit part.

In this context, the mounting part of the above-mentioned reflector may or may not be a part for mounting the lamp.

Also, the said removal preventing piece may be a flange part of a lamp socket of the lamp or be provided for a socket cover of a lamp socket of the lamp.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

The present invention is described in detail hereinafter with reference to embodiment(s) shown in the accompanying drawings.

Figure 1:
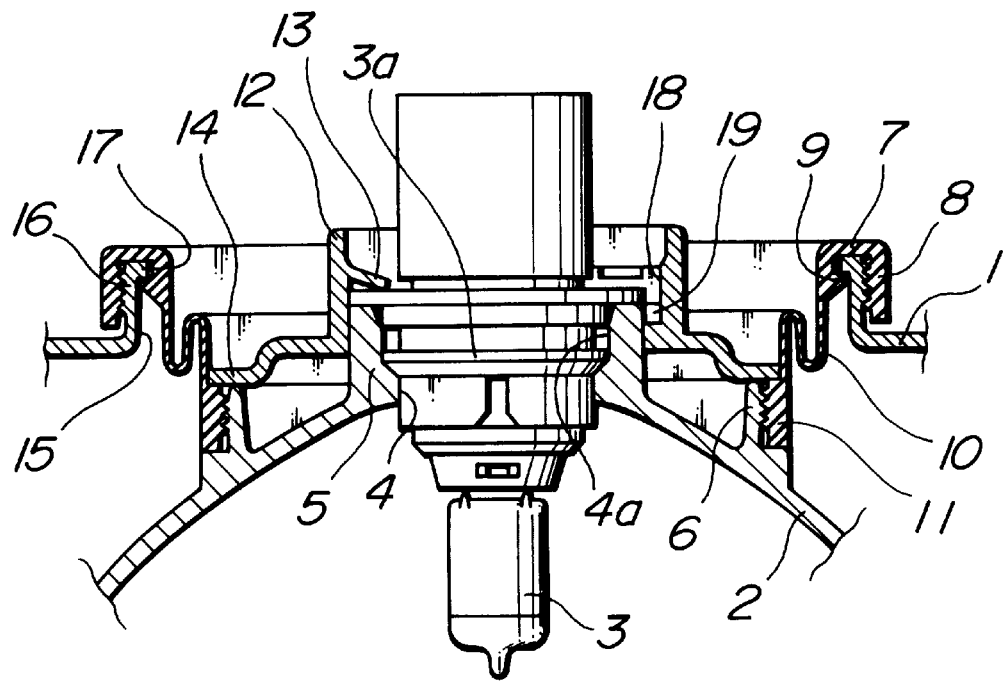
FIG. 1 is a sectional view of a first embodiment of the lighting fixture for a vehicle according to the present invention.

In FIG. 1, a lamp housing 1 is mounted and fixed to a car body (not shown). The lamp housing 1 has an opening 15 in the center of the rear thereof.

A cylindrical mounting part 16 protrudes rearward starting at the edge of the opening 15. The mounting part 16 has at the end a bumping edge 17 protruding toward the center of the housing.

A reflector 2 has an opening 4 at the center of the rear thereof and a cylindrical mounting part 5 is formed rearward around the edge of the opening 4. A lamp socket is inserted into the reflector in the way the socket is in close contact with the inside circumferential surface 4a of the mounting part 5.

An external cylindrical wall 6 is formed around the said mounting part 5 and the cylindrical wall has a larger diameter than that of the mounting part 5 and surrounds the mounting part 5.

A waterproof cover 7 comprises a cylindrical fit part 11 positioned inside, a cylindrical mounting part 8 positioned outside, and a thin intermediate part 10 connecting the fit part 11 to the mounting part 8.

The fit part 11 is pressure-fit into close contact with the external cylindrical wall part 6 and the mounting part 8 comes into close contact with the mounting part 16 to seal a space therebetween.

A mating piece 9 mates with the bumping edge 17. A socket cover 12 is constructed like a bayonet and comprises a piece 14 for preventing an unexpected removal of the fit part and for covering the fit part 11 of the waterproof cover 7 and the external wall 6, a retaining piece 13 for fixing a cylindrical lamp socket 3a positioned in the center, and a notched part 18. When the socket cover 12 is pushed and turned, the lamp socket 3a is fixed and the notched part mates with a mating, protruding part 19 provided with the mounting part 5.

As shown above, the above-mentioned waterproof cover is not fit directly on the lamp. This makes it possible to replace the lamp without removing the waterproof cover from the lamp housing. Also, the fit part and the peripheral wall that serve to seal the waterproof cover are covered with the removal preventing piece provided with the socket cover, thus eliminating the possibility of an unexpected touch with the fit part by a user replacing the lamp. For this reason, there will be no possibility of a drop in the waterproof performance of the cover due to an unexpected hard push on the fit part.

Figure 2:
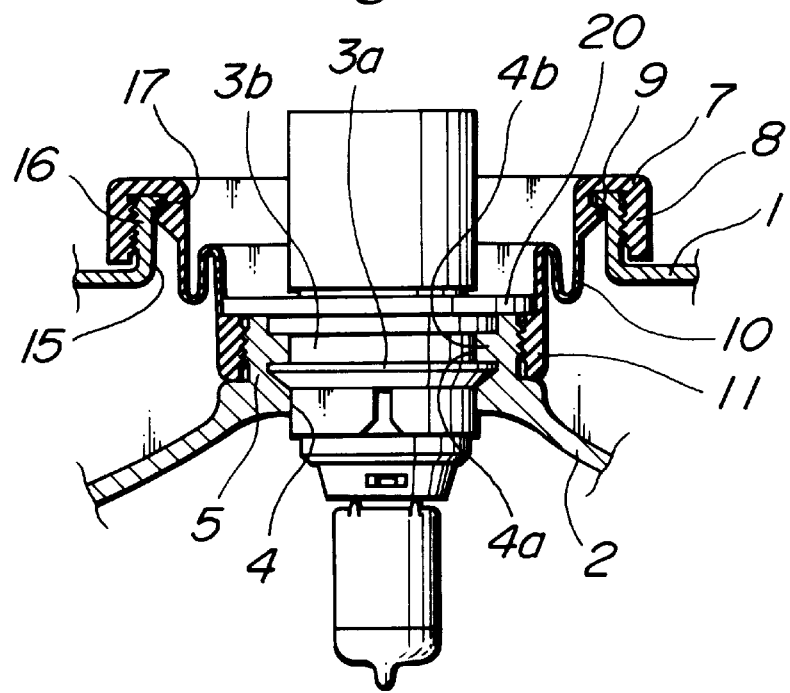
FIG. 2 is a sectional view of a second embodiment of the lighting fixture for a vehicle according to the present invention.
Figure 3:
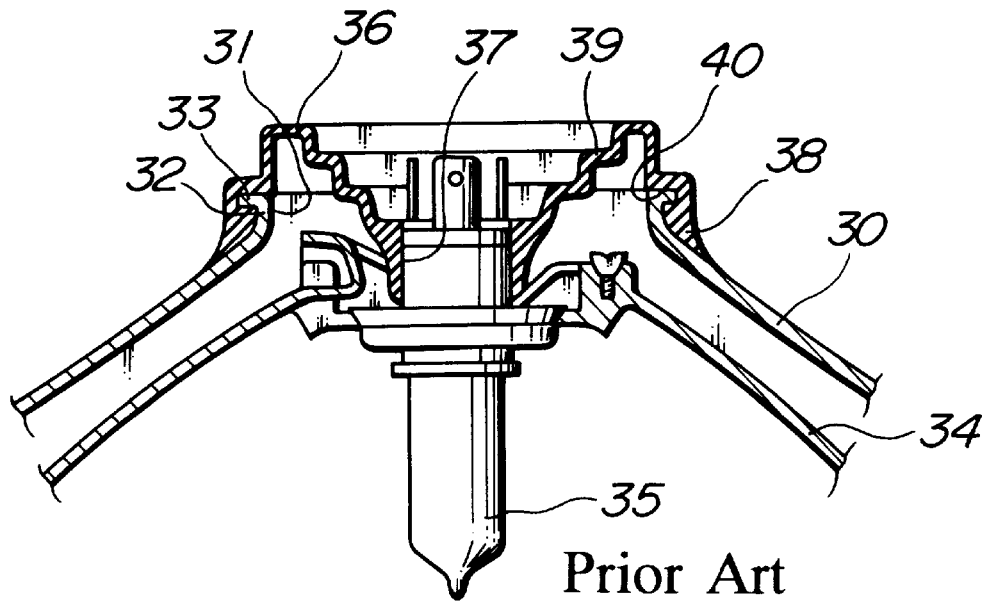
FIG. 3 is a sectional view of an example of a conventional lighting fixture for a vehicle.
Figure 4:
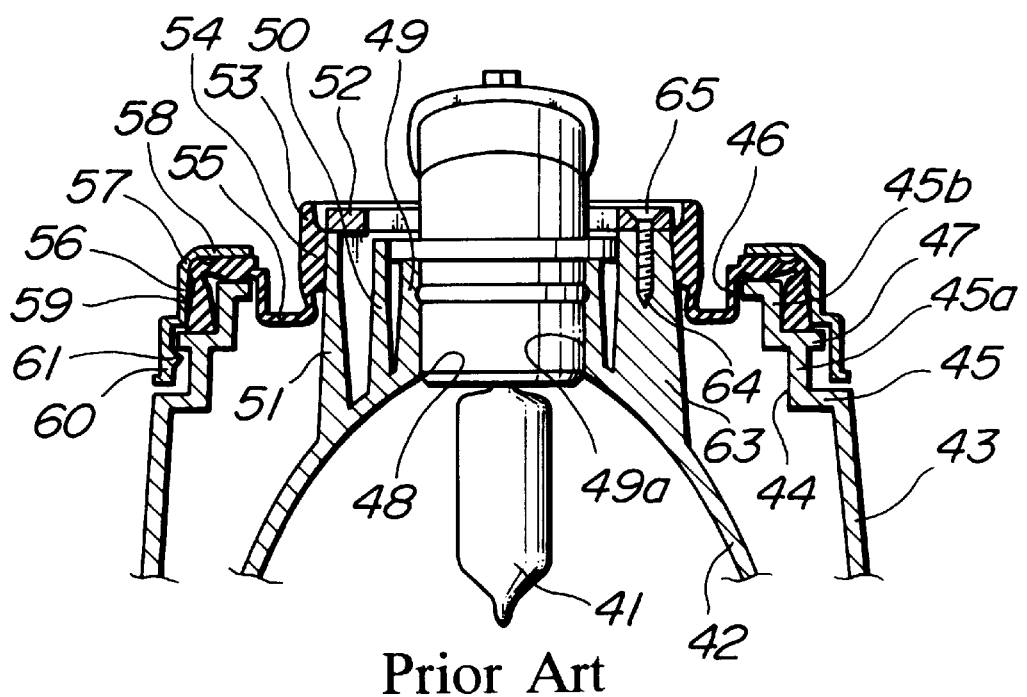
FIG. 4 is a sectional view of another example of a conventional lighting fixture for a vehicle.

Next, the second embodiment of the present invention shown in FIG. 2 is described hereinafter. The second embodiment of the present invention is different from the first one in that the second one does not have a socket cover. The smaller number of parts has enabled the second one to be simpler and reduce cost.

Like the first one, a lamp housing 1 has an opening 15 in the center of the rear thereof. A cylindrical mounting part 16 protrudes rearward starting at the edge of the said opening 15. The said mounting part 16 has at the end a bumping edge 17 protruding toward the center of the housing.

A reflector 2 has an opening 4 in the center of the rear thereof. A cylindrical mounting part 5 is formed rearward around the edge of the opening 4. A waterproof cover 7 comprises a cylindrical fit part 11 positioned inside, a cylindrical mounting part 8 positioned outside, and a thin intermediate part connecting the cylindrical fit part 11 to the mounting part 8.

The said fit part 11 is pressure-fit into close contact with the mounting part 5 and the mounting part 8 comes into close contact with the mounting part 16 to seal the space therebetween.

In the second embodiment of the present invention, the lamp socket is constructed like a bayonet in the way the lamp socket 3a mates with an inside circumferential surface 4a of the said mounting part 5 when the lamp socket 3a is turned while pushed. More particularly, a mating, protruding part 4b on the inside circumferential surface 4a and a notched part 3b of the lamp socket 3a mate with each other when the lamp is inserted into the opening 4 in the reflector 2 and turned while pushed.

A mating piece 9 mates with a bumping edge 17. The flange part 20 of the lamp socket 3a covers the fit part 11 of the waterproof cover 7 and the mounting part 5 of the reflector.

As shown above, the use of the mounting part 5 of the reflector that serves as a peripheral wall with which the fit part 11 of the waterproof cover 7 comes into close contact makes it possible to provide a simple and small headlight. Furthermore, the flange part 20 of the lamp socket 3a covers the fit part 11 and the mounting part 5 that serve together to seal the waterproof cover, and the lamp socket 3a is constructed like a bayonet in the way the lamp socket 3a mates with the inside circumferential surface 4a of the mounting part. This makes it possible to prevent a drop in the waterproof performance of the cover even if it is pushed hard accidentally by a user.

As shown in the first and the second embodiment of the prevent invention, in the waterproof construction of the reflector so mounted as to tilt freely in the lamp housing, a drop in the waterproof performance of the cover due to the a hard push to its fit part by a user is prevented by the removal preventing piece or the flange part on the lamp socket.

Furthermore, in the second embodiment of the present invention, the fit part of the waterproof cover is pressure-fit into directly close contact with the mounting part of the reflector whereas in the first one, the fit part of the waterproof cover is pressure-fit into close contact with the peripheral wall around the mounting part of the reflector. This makes the second one simpler, designed more freely, and less costly.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A lighting fixture for a vehicle, comprising:

a housing having an opening, a reflector having an opening and holding a lamp in the opening that is so supported as to tilt freely in the housing, and a waterproof cover for covering a space between the opening of the reflector and the opening of the housing, wherein a first cylindrical mounting part is formed to protrude rearward in the rear of the reflector, a second cylindrical mounting part is formed to protrude rearward in the rear of the housing, the waterproof cover comprises a cylindrical fit part positioned radially inside, a third cylindrical mounting part positioned radially outside, and an intermediate part connecting the cylindrical fit part and the third mounting part, the fit part of the waterproof cover is mounted on the first mounting part of the reflector, the third mounting part of the waterproof cover is mounted on the second mounting part of the housing, and a piece covering the fit part of the waterproof cover and the first mounting part of the reflector for preventing an unexpected removal of the fit part.

2. A lighting fixture for a vehicle according to claim 1, wherein the mounting part of the reflector is a first mounting part for mounting a lamp.

3. A lighting fixture for a vehicle according to claim 1, further comprising a lamp socket of the lamp, the reflector holding the lamp socket in the reflector opening, wherein the piece for preventing an unexpected removal of the fit part is a flange part of the lamp socket of the lamp.

4. A lighting fixture for a vehicle according to claim 1, further comprising a lamp socket of the lamp, the reflector holding the lamp socket in the reflector opening, and a socket cover for the lamp socket, wherein the piece for preventing an unexpected removal of the fit part is provided for the socket cover for the lamp.

5. A lighting fixture for a vehicle according to claim 2, further comprising a lamp socket of the lamp, the reflector holding the lamp socket in the reflector opening, wherein the the piece for preventing an unexpected removal of the fit part is a flange part of the lamp socket of the lamp.

6. A lighting fixture for a vehicle according to claim 2, further comprising a lamp socket of the lamp, the reflector holding the lamp socket in the reflector opening, and socket cover for the lamp socket, wherein the piece for preventing an unexpected removal of the fit part is provided for the socket cover for the lamp socket of the lamp.

* * * * *